United States Patent [19]

Sano et al.

[11] Patent Number: 4,984,646
[45] Date of Patent: Jan. 15, 1991

[54] STEERING SYSTEM FOR MOTOR VEHICLE

[75] Inventors: Shoichi Sano; Yoshimi Furukawa, both of Tokyo; Akihiko Takei, Saitama; Yutaka Nishi, Saitama; Yasuaki Ohno, Saitama, all of Japan

[73] Assignee: 501 Honda Giken Kogyo Kabushiki Kaisha, Minato, Japan

[21] Appl. No.: 323,496

[22] Filed: Mar. 14, 1989

[30] Foreign Application Priority Data

Mar. 14, 1988 [JP] Japan ................ 63-61670

[51] Int. Cl.⁵ ............................................. B62D 5/04
[52] U.S. Cl. ................................................. 180/79.1
[58] Field of Search ......................... 180/79.1, 132

[56] References Cited

U.S. PATENT DOCUMENTS

| 3,011,579 | 12/1961 | Milliken et al. | 180/142 |
| 4,557,342 | 12/1985 | Drutchas | 180/132 |
| 4,582,155 | 4/1986 | Ohe | 180/79.1 |
| 4,799,566 | 1/1989 | Shimizu | 180/79.1 |
| 4,802,544 | 2/1989 | Maeda | 180/79.1 |
| 4,830,127 | 5/1989 | Ito et al. | 180/79.1 |
| 4,860,844 | 8/1989 | O'Neil | 180/79.1 |
| 4,865,144 | 8/1989 | North | 180/79.1 |

Primary Examiner—Richard A. Bertsch
Assistant Examiner—Alan M. Kagen

[57] ABSTRACT

A steering system for a motor vehicle having power steering means including an actuator for turning steerable road wheels of the motor vehicle includes a control mechanism for eliminating a deviation between a desired direction of travel of the motor vehicle and an actual direction of travel of the motor vehicle, based on an output signal from a direction indicating mechanism which indicates the desired direction and an output signal from a direction detecting mechanism which detects the actual direction. The control mechanism determines a target turning angle for the steerable road wheels dependent on the deviation between the desired direction and the actual direction, and controls the power steering mechanism to turn the steerable road wheels up to the target turning angle.

9 Claims, 4 Drawing Sheets

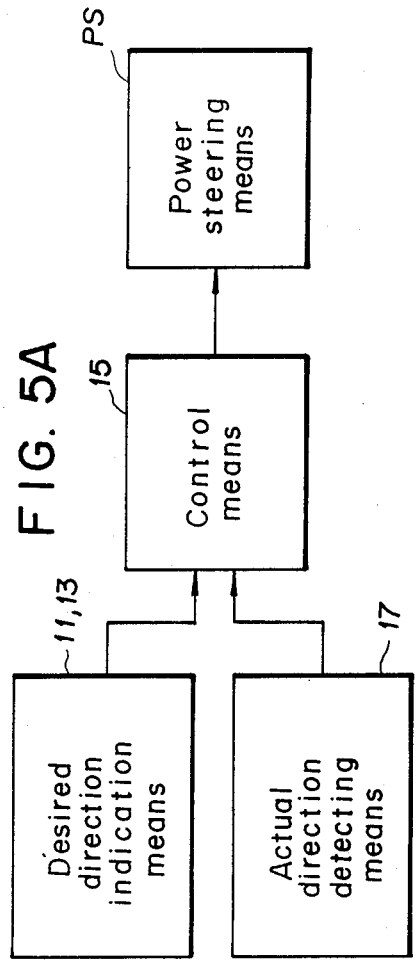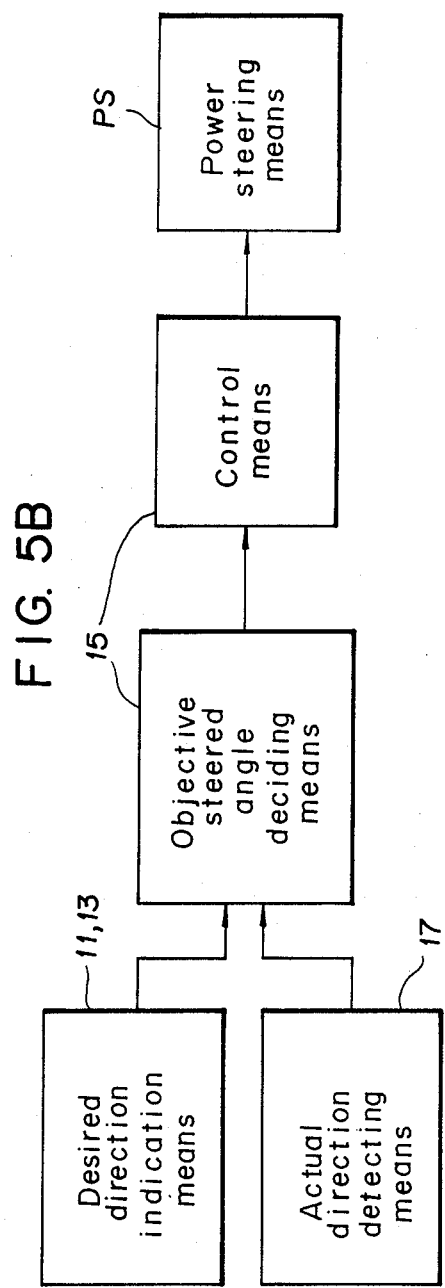

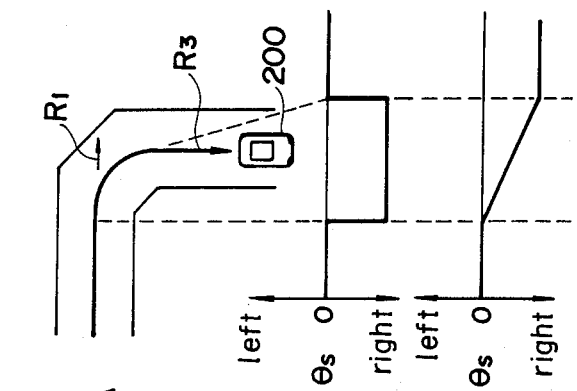
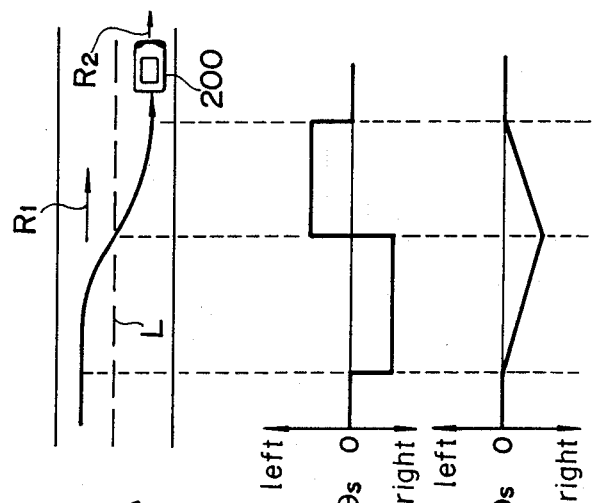

STEERING SYSTEM FOR MOTOR VEHICLE

BACKGROUND OF THE INVENTION

1. Field of the Invention:

The present invention relates to a steering system for use in a motor vehicle.

2. Description of the Relevant Art:

Conventional steering systems for motor vehicles or the like include mechanical components such as gear, links, and the like which operatively interconnect a steering wheel and steerable road wheels. Steering action of the steering wheel is transmitted via the mechanical components to the steerable road wheels to turn the road wheels through an angle dependent on a steering angle $\theta s$ of the steering wheel. In such a steering system, the steering angle $\theta s$ represents a desired amount (or a desired angle) by which the motor vehicle is to be turned from a reference direction of the motor vehicle (i.e., a straight running direction of the motor vehicle). Therefore, where the steering angle $\theta s$ is zero, the motor vehicle runs along a straight course without changing its direction of travel.

When a motor vehicle 200 is to change lanes as shown in FIG. 6A of the accompanying drawings, the steering angle $\theta s$ varies as shown in FIG. 6B while the resultant direction R2 of travel is the same as the initial direction R1 of travel. More specifically, when the motor vehicle 200 starts changing lanes, the steering wheel thereof (not shown) is turned in one direction (to the right in FIG. 6B) from a neutral position ($\theta s=0$). When the motor vehicle 200 goes beyond a lane separating line L, the steering wheel is turned in the opposite direction (to the left) beyond the neutral position. When the motor vehicle 200 enters the desired other lane, the steering wheel is turned again in said one direction to allow the motor vehicle 200 to run straight, and then is returned to the neutral position.

When the motor vehicle 200 makes a 90°-turn along a road bend around a corner as shown in FIG. 7A, the resultant direction R3 of travel of the motor vehicle 200 is angularly shifted 90° clockwise from the original direction R1 of travel. At this time, the steering angle $\theta s$ varies as shown in FIG. 7B. At the start of making the turn, the steering wheel is turned in one direction (to the right in FIG. 7B) from the neutral position. When the motor vehicle 200 completes the 90°-turn, the steering wheel is turned in the opposite direction (to the left) back to the neutral position.

For steering the motor vehicle equipped with the above steering system, the driver may apply, as one steering input, a steering angle $\theta s$ as a basis for producing a turning angle $\delta$ of a steerable road wheel (e.g., a front wheel turning angle $\delta f$), to the steering system. The behavior of the motor vehicle while it is making a turn is greatly affected by lateral motion (transverse motion) and yawing. While the motor vehicle is making a stable turn, the lateral acceleration of the motor vehicle, a yaw rate (yaw angular velocity) r, and the radius R of the turning circle are related to the turning angle $\delta$ (here, the front wheel turning angle $\delta f$) and the vehicle speed V as follows:

$$\ddot{y} = \frac{1}{1 + Kf \cdot V^2} \cdot \frac{V^2}{l} \cdot \delta f \quad (1)$$

$$r = \frac{1}{1 + Kf \cdot V^2} \cdot \frac{V}{l} \cdot \delta f \quad (2)$$

$$R = (1 + Kf \cdot V^2) \cdot \frac{l}{\delta f} \quad (3)$$

where l: the wheelbase, and

Kf: the stability factor indicative of the response of the motor vehicle.

As can be understood from the above equations (1), (2), and (3), in order to get a desired turning behavior of the motor vehicle, the driver is required to achieve an appropriate turning angle $\delta f$ by giving a steering angle ($\theta s$) in view of the vehicle speed V.

When the speed of movement of the motor vehicle is high, and the lateral slip angle of the tires is large, the cornering forces produced by the tires become nonlinear. In such a case, the stability factor Kf is also varied as it is affected by the transient characteristics. Therefore, the driver is also required to turn the steering wheel while taking into account such a change in the stability factor Kf.

SUMMARY OF THE INVENTION

It is an object of the present invention to provide a steering system for steering a motor vehicle in a desired direction through a relatively simple steering action.

According to the present invention, there is provided a steering system for a motor vehicle having power steering means including an actuator for turning steerable road wheels of the motor vehicle, said steering system comprising: direction indicating means for indicating a desired direction of travel of the motor vehicle with respect to a reference direction of the motor vehicle; direction detecting means for detecting an actual direction of travel of the motor vehicle; and control means responsive to an output signal from said direction indicating means and an output signal from said direction detecting means for controlling said power steering means to eliminate a deviation between said desired direction and said actual direction based on said output signals.

According to the present invention, there is also provided a steering system for a motor vehicle having power steering means including an actuator for turning steerable road wheels of the motor vehicle, said steering system comprising: direction indicating means for indicating a desired direction of travel of the motor vehicle with respect to a reference direction of the motor vehicle; direction detecting means for detecting an actual direction of travel of the motor vehicle with respect to said reference direction; target turning angle determining means responsive to an output signal from said direction indicating means and an output signal from said direction detecting means for calculating a deviation between said desired direction and said actual direction based on said output signals, and for determining a target turning angle for the steerable road wheels dependent on said deviation; and control means responsive to an output signal from said target turning angle determining means for controlling said power steering means to turn said steerable road wheels up to said target turning angle.

The above and further objects, details and advantages of the present invention will become apparent from the following detailed description of a preferred embodi-

BRIEF DESCRIPTION OF THE DRAWINGS

FIGS. 5A and 5B are block diagrams showing functional blocks of the steering system;

FIGS. 6A through 6C are diagrams illustrating how a steering amount varies when a vehicle changes lanes; and FIGS. 7A through 7C are diagrams showing how a steering amount varies when a vehicle makes a turn.

DETAILED DESCRIPTION OF THE PREFERRED EMBODIMENT

Figure 1:
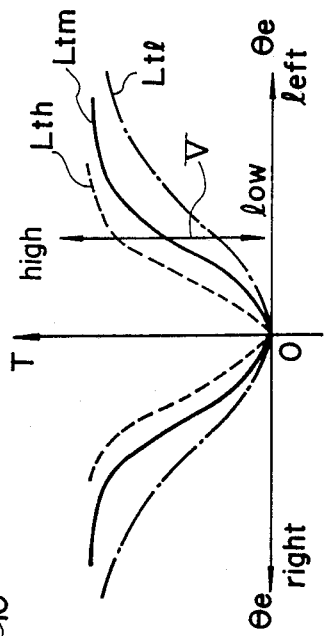
FIG. 1 is a schematic perspective view of a steering system for a motor vehicle according to a preferred embodiment of the present invention.
Figure 2:
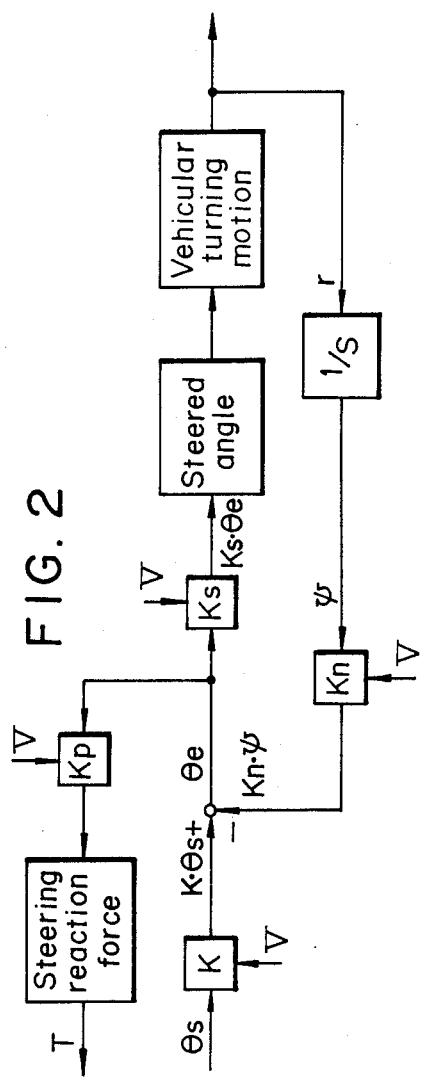
FIG. 2 is a block diagram of the steering system.

As shown in FIGS. 1 and 2, a steering system 10 for a motor vehicle according to the present invention has a steering wheel 11 (direction indicating means) fixedly mounted on the upper end of a steering shaft 12 rotatably supported on a vehicle body (not shown). The steering shaft 12 is mechanically separate from steerable road wheels (not shown), and an encoder 13 and a resistive force generator 14 (resistive force applying means) including an electric motor (not shown) are mounted on the lower end of the steering shaft 12. The encoder 13 and the resistive force generator 14 are electrically connected to a controller 15 (control means) comprising a microcomputer and other electronic devices. The encoder 13 detects the angular displacement of the steering shaft 12 and applies a signal indicative of a steering angle $\theta s$ to the controller 15. The electric motor of the resistive force generator 14 is controlled by the controller 15, as described later on, to apply a steering resistive force T to the steering shaft 12, i.e., the steering wheel 11 as it is turned.

When the steering wheel 11 is turned, the steering resistive force T is applied to the steering wheel 11 by the resistive force generator 14. Since the steering wheel 11 is mechanically disconnected from the steerable road wheels, as described above, a self-aligning torque generated by the steerable road wheels when they are turned is not imposed on the steering wheel 11. In addition, the steering wheel 11 is not biased to rotate in either direction. As a consequence, the steering wheel 11 tends to stay in whatever position it may have been stopped by the driver of the motor vehicle.

In the motor vehicle equipped with the steering system 10, the steering angle $\theta s$ is regarded as being zero when the steerable road wheels (e.g., front road wheels) are directed in a straight running direction. A front wheel steering angle $\delta f$, for example, is varied dependent on a change in the steering angle $\theta s$, as described below, to control the direction of travel of the motor vehicle or its angle (i.e., yaw angle $\psi$) so as to achieve a desired direction or angle.

To the controller 15, there are electrically connected a speedometer 16, a yaw rate gyroscope 17 (direction detecting means), and a power steering mechanism PS. The speedometer 16 applies a signal indicative of a vehicle speed V to the controller 15. The yaw rate gyroscope 17 applies a signal representing a yaw rate r (yaw angular velocity r) of the motor vehicle to the controller 15. The power steering mechanism PS has an electric motor (not shown) for producing a steering force, and a gear mechanism (not shown) disposed between the electric motor and the steerable road wheels. The controller 15 energizes the electric motor of the power steering mechanism PS to turn the steerable road wheels. The controller 15 processes signals from the encoder 13, the speedometer 16, and the yaw rate gyroscope 17 according to a predetermined program, and controls the electric motor of the resistive force generator 14 to apply the steering resistive force to the steering wheel 11 and also controls the electric motor of the power steering mechanism PS to turn the steerable road wheels. The power steering mechanism PS is disclosed in Japanese Patent Application Nos. 62-331084 (331084/1987) filed Dec. 26, 1987 by the applicant.

Figure 4:
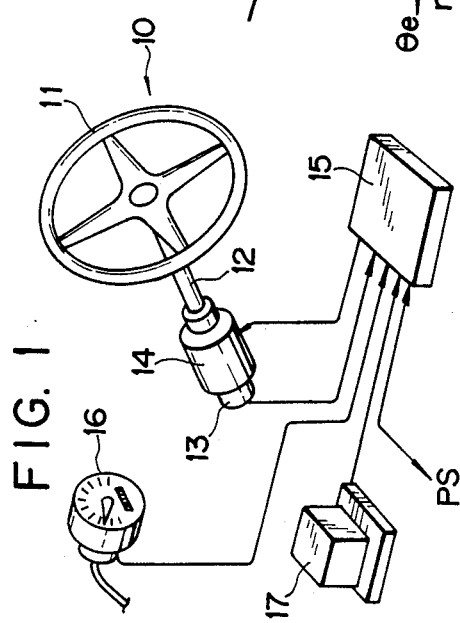
FIG. 4 is a graph showing steering reactive force characteristics in the steering system.

Operation of the steering system 10 will be described below with reference to FIGS. 2, 3, and 4.

The controller 15, in particular, of the steering system 10 has functions as shown in FIG. 2. The steering angle $\theta s$ of the steering wheel 11 is basically representative of a desired direction in which the motor vehicle should run, with respect to a reference direction of travel of the motor vehicle (i.e., the direction in which the motor vehicle runs at the time).

First, the steering angle $\theta s$ is multiplied by a gain constant K to determine a converted indicated angle $K.\theta s$. The yaw rate r is integrated to determine the yaw angle $\psi$ of the motor vehicle from time to time. The yaw angle $\psi$ is multiplied by a gain constant Kn to determine a converted running angle $Kn.\psi$ of the motor vehicle with respect to the reference direction. Then, the running angle $Kn.\psi$ is subtracted from the indicated angle $K.\theta s$ to calculate a deviation $\theta e$ therebetween. The deviation $\theta e$ is multiplied by a gain constant Ks to determine a target turning angle $Ks.\theta e$ for the steerable road wheels. Since the gain constant Ks for obtaining the target turning angle $Ks.\theta e$ is a function of the vehicle speed V as described later on, the gain constant Ks varies with the vehicle speed V. If the vehicle speed V is constant, then the gain constant Ks is also constant, and the target turning angle $Ks.\theta e$ is proportional to the deviation $\theta e$. The steerable road wheels are turned up to the target turning angle $Ks.\theta e$ by the power steering mechanism PS to cause the motor vehicle to make a turn. The turning motion of the motor vehicle varies the yaw rate r and also the converted running angle $Kn.\psi$ of the motor vehicle which has been calculated by the aforesaid integrating and multiplying process. In this manner, the steerable road wheels are turned until the running angle $Kn.\psi$ reaches the indicated angle $K.\theta s$ while feeding back the converted running angle $Kn.\psi$ from time to time.

At the same time that the steerable road wheels are turned, the steering resistive force T is applied to the steering wheel 11 by the resistive force generator 14. The steering resistive force T is basically of such a characteristic that it increases as the deviation $\theta e$ increases. The steering resistive force T also increases as the vehicle speed V increases, as described later.

Through the above functions, the steerable road wheels are continuously turned transitionally with a characteristic dependent on the deviation $\theta e$, until finally the converted running angle $Kn.\psi$ of the motor vehicle reaches the indicated angle $K.\theta s$. Even if the turning behavior of the motor vehicle is temporarily affected by a disturbance such as a lateral wind or the like, the final running angle $Kn.\psi$ of the motor vehicle is reliably achieved. Therefore, the running angle $Kn.\psi$ of the motor vehicle can reach the indicated angle $K.\theta s$ simply by turning the steering wheel 11 to give the desired indicated angle $K.\theta s$. As a consequence, the desired vehicle running angle $K.\theta s$ can be attained through relatively simple steering action.

More specifically, when the motor vehicle having the steering system 10 changes lanes as shown in FIG. 6A, the steering angle $\theta s$ varies as illustrated in FIG. 6C. With the steering system 10, the lanes can be changed only by a steering action effected on one side of a temporary neutral position, and hence it is not necessary to effect a steering action on both sides of the neutral position as with the conventional steering system as shown in FIG. 6B.

When the motor vehicle having the steering system 10 makes a 90°-turn as shown in FIG. 7A, the steering angle $\theta s$ varies as shown in FIG. 7C. With the steering system 10, when the turn is completed, the steering wheel 11 is kept in the position to which it has been turned, and does not need to be returned to the neutral position as with the conventional steering system as shown in FIG. 7B.

FIGS. 5A and 5B illustrate functional blocks of the steering system 10.

According to the functions shown in FIG. 2, the deviation $\theta e$ is determined as follows:

$$\theta e = K \cdot \theta s - Kn \cdot \psi \quad (4)$$

The target turning angle $Ks.\theta e$ is determined on the basis of the deviation $\theta e$.

All of the gain constants K, Kn, Ks, and Kp are functions of the vehicle speed V, and vary with the vehicle speed V.

By dividing both sides of the equation (4) by $\theta s$, the following equation is obtained:

$$\theta e/\theta s = K - Kn \cdot \psi/\theta s \quad (4')$$

Inasmuch as the gain constants K, Kn are constant if the vehicle speed V is constant, the lefthand side ($\theta e/\theta s$) of the equation (4') indicates a normalized deviation or normalized input Nd, whereas the term $\psi/\theta s$ on the righthand side indicates a normalized output No. From another standpoint, the lefthand side ($-\theta e/\theta s$) of the equation (4') represents the sensitivity of the deviation $\theta e$ to the steering angle $\theta s$, and the term $\psi/\theta s$ on the righthand side represents the sensitivity of the yaw angle $\psi$ to the steering angle $\theta s$.

Figure 3:
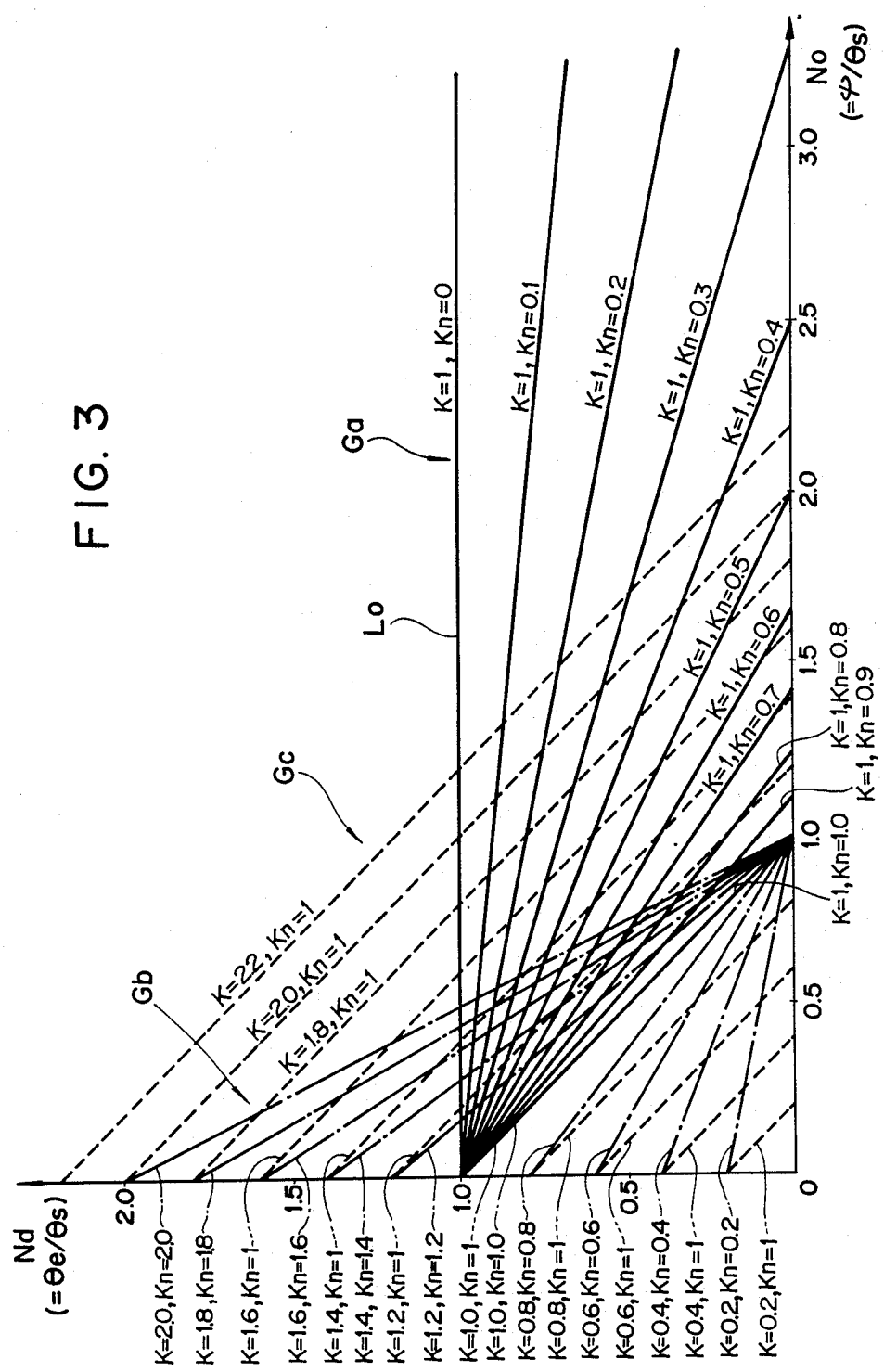
FIG. 3 is a graph showing functional characteristics of the steering system.

For example, if the gain constants K, Kn in the equation (4') are set so as to vary as described below, then characteristic curve groups Ga, Gb, and Gc indicated by the solid lines, the dot-and-dash lines, and the broken lines in FIG. 3 are obtained. It is assumed, however, that the vehicle speed V increases in increments.

Group Ga:

The gain constant K for the steering angle $\theta s$: $K=1$, i.e., it is constant regardless of the vehicle speed V;

The gain constant Kn for the yaw angle $\psi$: this increases in proportion to the vehicle speed V.

In the group Ga, the gain Kn for the yaw angle $\psi$ increases in proportion to the vehicle speed V. Therefore, the higher the vehicle speed V, the higher the sensitivity with which the yaw angle $\psi$ is detected. As a result, the rate of final change of the yaw angle $\psi$ with respect to a unit steering angle is smaller as the vehicle speed V is higher.

With a characteristic curve L0 achieved when $K=1$ and $Kn=0$, since the gain constant Kn for the yaw angle $\psi$ is zero, the yaw angle $\psi$ is not fed back. Therefore, if the steering function is performed along the characteristic curve L0, the functional characteristics of the steering system 10 are equivalent to those of the conventional steering system in which the steering wheel and the steerable road wheels are mechanically interlinked.

Group Gb:

The gain constants K, Kn: Both decrease in inverse proportion to the vehicle speed V.

In the group Gb, the higher the vehicle speed V, the lower the sensitivity with which the steering angle $\theta s$ is applied and the sensitivity with which the yaw angle $\psi$ is detected.

Group Gc:

The gain constant K: this decreases in inverse proportion to the vehicle speed V;

The gain constant Kn: $Kn=1$, i.e., it is constant irrespective of the vehicle speed V.

In the group Gc, the gain K for the steering angle $\theta s$ decreases in invers proportion to the vehicle speed V. Consequently, the higher the vehicle speed V, the lower the sensitivity with which the steering angle $\theta s$ is applied. As a result, the rate of final change of the yaw angle $\psi$ with respect to a unit steering angle is smaller as the vehicle speed V is higher.

As described above, the steering resistive force T basically increases as the deviation $\theta e$ increases and also as the vehicle speed V increases. The steering resistive force T and the gain constant Kp are represented by functions $T=Kp \cdot f(\theta e)$ and $Kp=g(V)$, respectively, where V indicates the vehicle speed. The latter function has such a characteristic that the gain constant Kp increases as the vehicle speed V goes higher. Therefore, when the vehicle speed V is in a low range, a medium range, and a high range, the steering resistive force T increases respectively along characteristic curves Ltl, Ltm, Lth, shown in FIG. 4 as the deviation $\theta e$ increases. Since an adequate resistive force is applied to the steering wheel 11 dependent on the deviation $\theta e$ and the vehicle speed V, the steering action of the steering wheel 11 is stabilized, giving the driver a good steering feeling.

In the above embodiment, the gain constants K, Kn, Kp are basically functions of the vehicle speed V only. However, they may be functions of (i) a steering amount such as a steering speed of the steering wheel 11, the deviation $\theta e$, etc., or (ii) a vehicle running condition such as the speed of a lateral wind applied to the motor vehicle, etc., or their combination. The present invention is applicable also to a steering system for a motor vehicle having steerable front and rear road wheels.

A geomagnetism sensor may be employed instead of the yaw rate sensor 17 as means for detecting the actual direction of travel of the motor vehicle. Where such a geomagnetism sensor is used, the northward direction is used as an absolute reference direction.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

What is claimed is:

1. A steering system for a motor vehicle having power steering means including
an actuator for turning steerable road wheels of the motor vehicle,
said steering system comprising:
direction indicating means
for indicating a desired direction of travel of the motor vehicle
with respect to a reference direction of the motor vehicle;
direction detecting means
for detecting an actual direction of travel of the motor vehicle; and
control means responsive to
an output signal from said direction indicating means and
an output signal from said direction detecting means
for controlling said power steering means
to eliminate a deviation between
said desired direction and
said actual direction based on said output signals;
said direction indicating means including
a steering wheel mechanically separate from said steerable road wheels and which is not biased to rotate in either direction so the steering wheel remains in a position to which it has been moved by an operator after turn of the vehicle has been completed and the wheels have returned to a neutral position; and
said direction indicating means being operable to indicate a desired absolute direction in which said motor vehicle is to travel.

2. A steering system according to claim 1, further comprising
indicated direction gain control means
for varying a gain of the output signal from said direction indicating means.

3. A steering system according to claim 2, wherein said indicated direction gain control means comprises
means for controlling said gain
so as to reduce the gain in inverse proportion to a speed of travel of the motor vehicle.

4. A steering system according to claim 1, further comprising
detection gain control means
for varying a gain of the output signal from said direction detecting means.

5. A steering system according to claim 4, wherein said detection gain control means comprises
means for controlling said gain
so as to increase the gain in proportion to a speed of travel of the motor vehicle.

6. A steering system according to claim 1 further comprising:
resistive force applying means
for applying a steering resistive force to said direction indicating means; and
resistive force control means
for controlling said resistive force applying means
to apply the steering resistive force
which increases in proportion to said deviation between said desired direction and said actual direction.

7. A steering system according to claim 6, wherein said resistive force control means comprises
means for controlling said resistive force applying means
to increase a rate of change of said steering resistive force with respect to said deviation
in proportion to a speed of travel of the motor vehicle.

8. A steering system for a motor vehicle having power steering means including
an actuator for turning steerable road wheels of the motor vehicle,
said steering system comprising:
direction indicating means
for indicating a desired direction of travel of the motor vehicle
with respect to a reference direction of the motor vehicle;
direction detecting means
for detecting an actual direction of travel of the motor vehicle
with respect to said reference direction;
target turning angle determining means
responsive to an output signal from said direction indicating means and an output signal from said direction detecting means
for calculating a deviation between said desired direction and said actual direction based on said output signals, and
for determining a target turning angle for the steerable road wheels dependent on said deviation; and
control means
responsive to an output signal from said target turning angle determining means
for controlling said power steering means
to turn said steerable road wheels up to said target turning angle;
said direction indicating means including
a steering wheel mechanically separate from said steerable road wheels and which is not biased to rotate in either direction so the steering wheel remains in a position to which it has been moved by an operator after turn of the vehicle has been completed and the wheels have returned to a neutral position; and
said direction indicating means being operable to indicate a desired absolute direction in which said motor vehicle is to travel.

9. A steering system for a motor vehicle having steerable road wheels, comprising;
direction detecting means for
detecting an actual direction of travel of the motor vehicle and
producing a detected signal indicating said actual direction;
steering means
mechanically separate from said steerable road wheels
for producing an indication signal
indicating a desired absolute direction of travel in which said motor vehicle is to travel, said steering means including a steering wheel which is turned by an operator to produce said indication signal, said steering wheel not being biased in either direction so that it remains in a position to which it as been turned after turn of the vehicle has been completed and the road wheels have returned to a neutral position; and control means
responsive to
said detected signal from said direction detecting means and said indication signal from said steering means
for transitionally turning said steerable road wheels to bring the resultant actual direction of travel of the motor vehicle into agreement with said desired direction
based on said detected and indication signals.

* * * * *